United States Patent
Akbulut et al.

(10) Patent No.: US 10,954,377 B2
(45) Date of Patent: Mar. 23, 2021

(54) ADMIXTURE AND INK COMPRISING THE ADMIXTURE

(71) Applicant: SABANCI ÜNIVERSITESI, Istanbul (TR)

(72) Inventors: Özge Akbulut, Istanbul (TR); Omid Akhlaghi, Istanbul (TR); Amin Hodaei, Istanbul (TR); Dilek Sezer, Istanbul (TR)

(73) Assignee: SABANCI ÜNIVERSITESI, Istanbul (TR)

( * ) Notice: Subject to any disclaimer, the term of this patent is extended or adjusted under 35 U.S.C. 154(b) by 264 days.

(21) Appl. No.: 16/335,688

(22) PCT Filed: Sep. 26, 2016

(86) PCT No.: PCT/TR2016/050354
§ 371 (c)(1),
(2) Date: Mar. 22, 2019

(87) PCT Pub. No.: WO2018/056918
PCT Pub. Date: Mar. 29, 2018

(65) Prior Publication Data
US 2020/0032044 A1   Jan. 30, 2020

(51) Int. Cl.
| | |
|---|---|
| C08K 3/013 | (2018.01) |
| C08L 51/00 | (2006.01) |
| C08F 220/06 | (2006.01) |
| C08F 220/54 | (2006.01) |
| C08F 226/06 | (2006.01) |
| C08F 228/02 | (2006.01) |
| C08F 230/02 | (2006.01) |
| C08F 290/06 | (2006.01) |
| B33Y 70/00 | (2020.01) |
| B33Y 80/00 | (2015.01) |
| C08K 3/08 | (2006.01) |
| C08K 3/22 | (2006.01) |

(52) U.S. Cl.
CPC .......... *C08L 51/003* (2013.01); *C08F 220/06* (2013.01); *C08F 220/54* (2013.01); *C08F 226/06* (2013.01); *C08F 228/02* (2013.01); *C08F 230/02* (2013.01); *C08F 290/062* (2013.01); *C08K 3/013* (2018.01); *B33Y 70/00* (2014.12); *B33Y 80/00* (2014.12); *C08K 2003/085* (2013.01); *C08K 2003/0806* (2013.01); *C08K 2003/2227* (2013.01); *C08K 2003/2296* (2013.01)

(58) Field of Classification Search
CPC ....... B33Y 70/00; B33Y 80/00; C08F 228/02; C08F 230/02; C08L 51/003
USPC .................................................. 523/160, 161
See application file for complete search history.

(56) References Cited

U.S. PATENT DOCUMENTS

| | | | |
|---|---|---|---|
| 2005/0089679 A1 | 4/2005 | Ittel et al. | |
| 2006/0183822 A1 | 8/2006 | Nguyen-Kim et al. | |
| 2011/0015280 A1 | 1/2011 | Nguyen Kim et al. | |
| 2014/0141168 A1* | 5/2014 | Rodgers | B33Y 10/00 427/265 |
| 2016/0236982 A1* | 8/2016 | Menceloglu | C04B 24/2647 |

FOREIGN PATENT DOCUMENTS

| | | |
|---|---|---|
| CN | 104725046 A | 6/2015 |
| CN | 104744050 A | 7/2015 |
| CN | 105130402 A | 12/2015 |
| WO | 2004018185 A1 | 3/2004 |
| WO | 2009063024 A1 | 5/2009 |

OTHER PUBLICATIONS

Salami et al (Synthesis, Effectiveness . . . Fluid Loss Additive in Oil Well Cementing, Journal of Applied Polymer Science, vol. 126, 1449-1460 (2012)) (Year: 2012).*

* cited by examiner

*Primary Examiner* — Doris L Lee
(74) *Attorney, Agent, or Firm* — Bayramoglu Law Offices LLC

(57) ABSTRACT

An admixture including at least one copolymer having a backbone. The backbone including at least one electrically charged monomer. The at least one copolymer is a grafted copolymer having mean molecular weight within a range between 600 g/mol and 3000 g/mol on side chains of the grafted copolymer. An additive manufacturing ink, Filament of the additive manufacturing ink, and inkjet printing ink including the admixture.

20 Claims, 1 Drawing Sheet

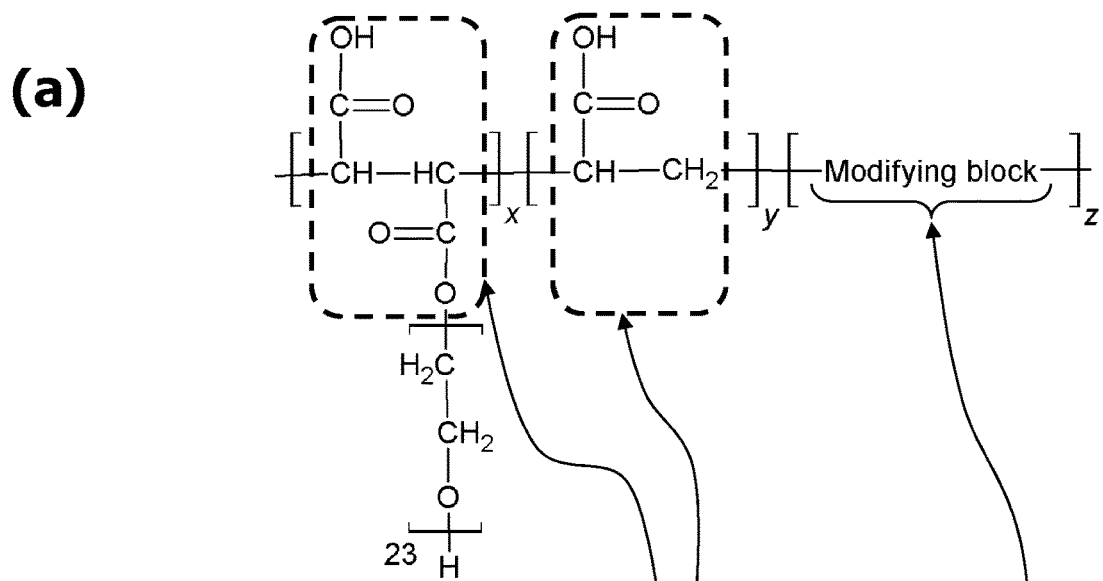
(a)
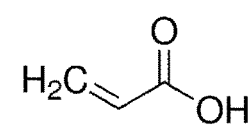 (b)  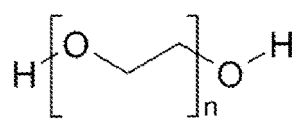 (c)
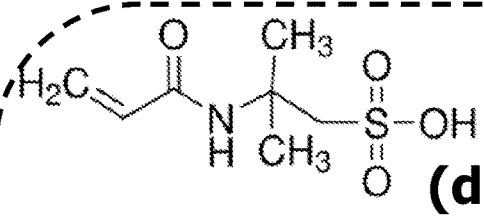 (d)  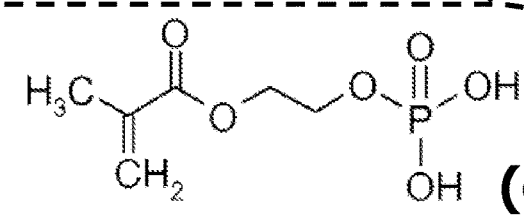 (e)
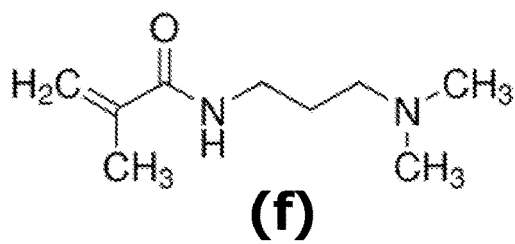 (f)  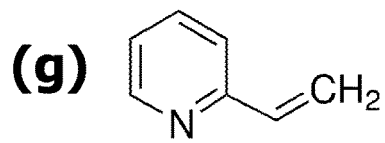 (g)
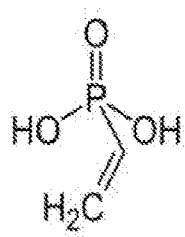 (i)  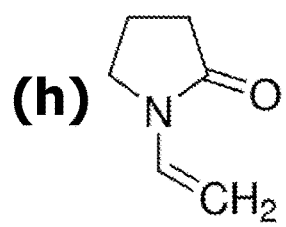 (h)

ADMIXTURE AND INK COMPRISING THE ADMIXTURE

CROSS REFERENCE TO THE RELATED APPLICATIONS

This application is the national phase entry of International Application No. PCT/TR2016/050354, filed on Sep. 26, 2016, the entire contents of which are incorporated herein by reference.

Technical Field

The present invention relates to an admixture for suspensions. More specifically, the present invention relates to an admixture for additive manufacturing and inkjet printing inks.

Background

Additive manufacturing (AM) enables transforming an object-in-mind to an object-in-hand. For people of any age, it triggered a maker's mindset in several communities and empowered individuals to realize their designs. While initially aimed for prototyping and quick constructions, depositing materials layer-by-layer or dot-by-dot holds the promise for actual, functional objects that cannot be conceived with other manufacturing methods. Making functional objects, on the other hand, necessitates the ability to render the actual material(s) of these objects "depositable". In other words, the extent of additive manufacturing scales with the availability of a portfolio of printable materials.

Existing formulations of non-plastic (e.g. metal or ceramics based) additive manufacturing (AM) inks, both commercial- and laboratory-scale, utilize several additives (dispersants, binders, defoamers etc.) and non-aqueous solvents to optimize parameters of printing process, including workability, fluidity or viscosity of the ink.

Recently, 3D periodic structures fabricated from colloidal inks have found widespread technological applications such as advanced ceramics, sensors, composites, and tissue engineering scaffolds. Various direct-write techniques, such as robocasting, inkjet printing, hot-melt printing, three-dimensional printing, micropen writing, and fused deposition, employ inks that solidify either by liquid evaporation or a temperature-induced phase change. Due to their initial fluidity, most of these inks are incapable of fully supporting their own weight during assembly. In direct ink writing (DIW), inks are extruded through a deposition nozzle and set immediately to facilitate shape retention of deposited features. These colloidal inks must satisfy two important criteria; namely exhibiting a well-controlled viscoelastic response and containing a high colloidal volume fraction to minimize drying-induced shrinkage after assembly as well as for high resolution.

Current formulations to date require considerable amounts of organic dispersants and polymeric binders to achieve highly loaded stable suspensions particularly when nano-sized particles are targeted for ink production. Consequently, the presence of high organic content demands binder removal steps. This removal potentially results in shape inaccuracies due to large dimensional changes. In addition, preparation of these inks generally relies on utilization of energy demanding systems, such as mechanical ball milling, ultrasonication, and roll milling, to enhance the homogeneity of the ink.

In the current state of the art, highly loaded additive manufacturing inks are available. Yet, these products require a combination of multiple additives, most of the time in high amounts, and therefore optimization of such complicated formulations is highly tricky.

Some of the related prior art can be listed as WO 2004/018 185A1, CN 10 5 130 402 A, CN 10 4 725 046 A, and CN 10 4 744 050 A.

The fluidity of current inks relies on the ability of charged polymers (e.g., poly(acrylic acid), polyethyleneimine, poly (vinyl alcohol), and cellulose) to adsorb onto oppositely charged colloidal particles thus load them with a higher charge such that the particles repel each other more and higher loadings can be possible. However, due to their simple structure, these polymers offer limited performance.

Current ceramic-based inks in the literature are presented as "viscosity-controlled" by the addition of charged homopolymers, binders, as well as introduction of various solvents to the ink system. However, it is worth to dedicate further research efforts for enhancing the extent of viscosity control in such suspensions.

SUMMARY

Primary object of the present invention is to overcome the abovementioned shortcomings of the prior art.

Another object of the present invention is provision of an admixture for obtaining environmentally benign and easy-to-prepare/optimize/control inks for additive manufacturing.

A further object of the present invention is provision of a water based admixture to be employed in highly loaded inks for additive manufacturing and inkjet printing inks loaded with a higher amount of inorganic particles than those available in the related technical field.

The present invention proposes an admixture comprising one or more copolymer having with a backbone including at least one electrically charged monomer. The present invention further proposes additive manufacturing ink, filament of the additive manufacturing ink, and inkjet printing ink comprising such admixture.

BRIEF DESCRIPTION OF THE DRAWINGS

The FIGURE, whose brief explanation is herewith provided, is solely intended for providing a better understanding of the present invention and is as such not intended to define the scope of protection or the context in which said scope is to be interpreted in the absence of the description.

FIG. 1 shows an exemplary chemical formula of (a) a (grafted) copolymer employable in the admixture according to the present invention; wherein
  exemplary alternative copolymers given as (b) acrylic acid (AA) and (c) polyethylene glycol (PEG); and exemplary alternative modifying blocks given as (d) 2-acrylamido-2-methylpropanesulfonic acid (AMPS), (e) phosphate esters of poly(propylene glycol) (PPG) monomethacrylate (currently obtainable on the market with the brand name SIPOMER® PAM 200), (f) N-[3 (dimethylamino)propyl]methacrylamide (DMAPMA), (g) 2-(tert-butylamino)ethyl methacrylate (BAEMA), (h) 2-vinyl pyridine, (i) 1-vinyl-2-pyrrolidinone and (j) vinyl phosphonic acid (VPA).

DETAILED DESCRIPTION OF THE EMBODIMENTS

Referring now the FIGURE outlined before, the present invention proposes an admixture comprising one or more copolymer having with a backbone including at least one electrically charged monomer.

In a preferred alternative, the copolymer is an alternating or random copolymer. Preferably, the copolymer is a block copolymer. The backbone may preferably comprise acrylic acid or methacrylic acid.

Said one or more copolymer is preferably a grafted copolymer having mean molecular weight within the range between 600 g/mol and 3000 g/mol on its side chains. This enhances the steric hindrance between solid particles in a formulation where the admixture is employed. The side chain may comprise poly(ethylene glycol) (PEG), or poly (ethylene oxide) (PEO). Thus, in use, the density of side chains can be optimized in accordance with respective target particle size that is to be used in the preparation of the suspension. In short, the grafted copolymer is to be optimized depending on the size, surface charge and surface potential of the particles that form the suspension.

Accordingly, the present invention further proposes an additive manufacturing (AM) ink comprising the admixture, comprising 60 wt. % to 80 wt. % of inorganic solid content with respect to the total weight of the ink composition, and having a volume fraction of ink within the range of 35% (v/v) and 55% (v/v) with respect to the total volume of the ink composition.

In the additive manufacturing ink, preferably, the ratio of the copolymer is 2.5 wt % or less with respect to the total weight of the solid content, for minimizing any necessity of a binder burnout step at sintering of the ink upon printing. More preferably, said ratio is 1.5 wt % or less, since it is observed that these values completely eliminate the necessity of said burnout step. Even more preferably within the range between 1.25 wt. % and 1.35 wt. %, where it is observed that an optimum extent of suspension stability is available. In the laboratory trials utilizing higher loadings for some applications (such as flexible electronics), the as-printed ink is used without any sintering step.

The present invention further proposes a filament of the above described additive manufacturing ink.

In a preferred embodiment, the filament has a width of 1 mm or less.

The present invention further proposes inkjet printing ink comprising said admixture, the formulation of said ink comprises at least 5 wt. % of inorganic solid content with respect to the total weight of the ink composition, having a volume fraction of ink within the range of 0.5% (v/v) and 1.3% (v/v) with respect to the total volume of the ink composition. Said amounts of inorganic solid content can be considered very high for inkjet preparations, which corresponds to a technical improvement in the field and can be achieved thanks to the admixture according to the present invention.

A further aspect of the present invention proposes the use of said admixture, in ink compositions. Accordingly, in the use of said admixture, the ink is an ink for additive manufacturing. Alternatively, the ink is an inkjet printing ink.

The present invention further proposes printed components prepared using an ink comprising said admixture. The component can be an electronic component, more specifically a flexible electronic component e.g. having a surface comprising an elastomer. In this case, the ink is deposited onto a flexible substrate such as a surface comprising an elastomer, or paper, or composites of flexible materials.

Also the printed component can have a flexible surface at the stage of printing. The component may be cured after printing. The component may also comprise paper and/or composites of flexible substrates.

Exemplary lab-scale trials to better understand the variables concerning the behavior of the admixture according to the present invention are performed, and mentioned below in an extent of detail. The explanations about said exemplary trials are as such not intended to limit the scope of the appended claims.

EXAMPLE

In the exemplary probations, the viscosity of inks is tuned by relying on a single chemical, a grafted random copolymer, by exploiting both electrostatic repulsion and steric hindrance in a single chemistry.

A series of PEG-grafted copolymers of acrylic acid (AA) were prepared, which can also be referred to as "PCE-based copolymers". Equimolar amounts of PEG and MA were loaded into a 250 mL three neck flask and the reaction medium was heated up to 90° C. The reaction medium was kept under nitrogen for 2 hours; then, cooled to room temperature. Esterified PEG (PEGMA) was obtained and used for further process without any purification. For a typical aqueous free radical polymerization, aqueous solutions with total reactant concentrations of 10-15 wt % were prepared by using different molar ratios in 100-150 mL of deionized water. The mixtures were charged into three neck flasks connected to respective reflux condensers. Inert gas (Nitrogen) was purged to remove free oxygen throughout the reaction. For each reaction, after 30 minutes, the respective flask was heated up to 50-70° C. and aqueous solution of an initiator (e.g. ammonium persulfate (APS), potassium persulfate (KPS)) was dropwise added to the reaction chamber in 2-5 minutes. This solution contained 1 wt % KPS compared to all monomers mass in each bath of copolymerization. The reaction continued for different time intervals ranging from 4 hours up to 6 days. Finally, the reaction media were cooled down to room temperature. Afterwards, highly concentrated suspensions of a set of nanoparticles namely, aluminum oxide ($Al_2O_3$), iron oxide ($Fe_3O_4$), barium titanate ($BaTiO_3$), silver (Ag) and copper (Cu), were prepared. All the prepared colloidal suspensions were used in 3D printing of the complex structures through different nozzles with diameters ranging from 150-700 μm. The diameter of the nozzle (thus the resolution) also depends on the size of the nanoparticles. Currently, we have worked with nanoparticles having mean diameter of around 200 nm, and it is possible to work with those having a mean diameter of around 40-50 nm, and in this case we can use nozzles with an extrusion opening width of 50 micrometer or less. This can further enhance the printing resolution.

All of the inorganic particles were commercially obtained, surface potentials of these particles were characterized through zeta potential measurements. Co-monomers offering different affinity of adsorption and high charge density (both anionic and cationic) can be utilized. Examples to suitable co-monomers for the exemplary preparations include: i) 2-acrylamido-2-methylpropane sulfonic acid (abbreviated as AMPS), ii) vinyl phosphonic acid (abbreviated as VPA), iii) N-[3(dimethylamino)propyl] methacrylamide (abbreviated as DMAPMA), iv) 2-(tert-butylamino)ethyl methacrylate (abbreviated as BAEMA), and v) 2-vinyl pyridine (abbreviated as 2VP). The density of PEG side chains can be preferably optimized, since the efficiency of grafting is correlated to the size of the particles. Regarding the length of the side chain PEG-1000 (g/mol), was selected as an efficient alternative with respect to those having distant molecular weights. Upon adsorption, PEG-1000 offers an adlayer thickness of 6-7 nm and this adlayer, while it is thin enough to minimize the excluded volume, provides sufficient thickness to shield the Van der Waals attraction between particles.

Rheological Characterization of Colloidal Suspensions to Prepare Highly Loaded Viscosity Controlled Inks:

Capacity of each copolymer to produce a printable ink can be evaluated by measuring the maximum solid content of the suspension ($\Phi_{max}$) in fluid form. The dependence of suspension viscosity ($\eta$, Pa·s) to the volume fraction of the dispersed solid particles can be fitted by Krieger-Dougherty equation.

In additive manufacturing with inks in form of filaments (longitudinal), the mean width of the filament (e.g. the width corresponds to the diameter of the filament in case where the filament is in shape of a cylinder) is preferably 1000 micrometers or less; the volume fraction of ink (solid content, $\Phi$) is preferably within the range between 35 v/v and 55 v/v; and the viscosity of the ink is preferably within the range between 10 and 100 Pa·s at 100 s$^{-1}$.

In inkjet printing, the volume fraction of ink (solid content, $\Phi$) is preferably within the range between 0.2 v/v and 0.27 v/v; and the viscosity of the ink is preferably within the range between 10 and 15.5 Pa·s at s$^{-1}$.

The ability of PCE-based copolymers to stabilize high loadings (e.g. 70-80% w/w of solid content in the formulation) of alumina suspensions, is examined. In alumina suspensions with particle size of ~200 nm, $\Phi$=72% (wt.) (equivalent to 40% (vol.)) is achieved while the theoretical limit for this size of alumina was $\Phi_{min}$=76% (wt.) (equivalent to 44% (vol.)). After fluid-gel transformation stage, shear viscometry and oscillatory measurements can be carried out to characterize the flow behaviour (determined by yield stress $\tau_6$, Pa) and elastic properties (storage modulus, G') of highly concentrated inks. At this stage, interparticle interactions can be specifically tailored by varying the amount of copolymer, time of mixing, time of ageing, and final solid content of the gel to develop 3D periodic structures with self-supporting ability. The shear rheology of these concentrated colloidal inks can be described by the Herschel-Bulkley model given below:

$$\tau = \tau_0 + K\dot{\gamma}^n$$

where $\tau$ is shear stress (Pa), $\dot{\gamma}$ is shear rate (s$^{-1}$), n is the shear thinning exponent (or flow index), and K is the consistency index. For extrusion through a nozzle and maintaining the filament shape, the target values that we can pursue are $10^2 < \tau_y, 10^3$ Pa and $10^5 < G' < 10^6$ Pa. Apart from $\tau_y$, through oscillatory measurements (mode of measurement), elasticity of inks can be monitored by tracking the plateau of storage modulus (G') in strain amplitude test. Within the linear viscoelastic region, appearance of a well-defined equilibrium G' that increases with concentration of nanoparticles towards $10^5$-$10^6$ Pa is indicative of formation of strong gel network, which is further advantageous for shape retention of inks after exiting the nozzle.

With the admixture according to the present invention, ceramic and metal based inks are formulated with highly concentrated colloidal suspensions that are capable of fully supporting their own weight during the assembly of final objects.

Characterization of Droplet Formation and Optimization in Inkjet Printing:

In inkjet printing, the dynamics of droplet formation can be captured by a high acquisition speed camera (with ~$10^4$-$10^6$ s$^{-1}$ acquisition rate) and quality of inks can be assessed based on ejection of individual drops with no satellite droplets. The drop formation behaviour of the inkjet inks is typically described by the inverse of the Ohnesorge number, which is given by below equation:

$$Oh^{-1} = \frac{\sqrt{\sigma \rho L}}{\mu}$$

where $\sigma$ is the surface tension (N/m) of the ink, $\rho$ is the ink density (kg/m$^3$), L is a characteristic length (nozzle diameter, m), and $\mu$ is viscosity of the ink (Pa·s). The range that defines the formation of single drops is $1 < Oh^{-1} < 10$. To control the printability of inks, we can precisely monitor viscosity (via shear/dynamic viscometry) and surface tension (via contact angle measurements and tensiometry equipped with Wilhelmy plate) of the ink suspensions. Here, preliminary indications were such that, the molecular weight of the copolymer affects the droplet formation. It is possible to change molecular weight by changing the pH of the polymerization medium, and/or addition of chain transfer agents during polymerization process. The tests have shown that polymerization in neutral medium (pH 7-8) decrease the molecular weight of the copolymer while synthesis in basic pH (e.g., pH of 13) leads to a high molecular weight copolymer.

Printing of Viscosity Controlled Inks Onto Flexible Items Such as Paper and Elastomeric Substrates:

Effects of different parameters on printability of each viscosity controlled ink can be evaluated via DIW. These parameters include the characteristic properties of copolymer (nature of co-monomer, molecular weight, and density of side chains), the amount of copolymer in the ink formulation, concentration of particles in the ink formulation, and time of aging. Homogeneity of printed lines as well as 3D objects can be analyzed by micro computed tomography (micro-CT).

For inkjet printing, distortion of the drops during solvent drying due to the interplay of ink viscosity and solute transport via solvent motion (coffee ring effect) are two most important factors that affect the homogeneity of inkjet-printed drops. In order to stabilize the geometry of the drop, wettability of the substrates can be modified by i) applying different coatings (e.g., hexamethyldisilazane), ii) plasma treatment, and iii) changing surface roughness [16, 17]. Quality of deposited drops, lines and films will be tracked by dark-field optical imaging and scanning electron microscopy (SEM).

The inks can contain inorganic solid content including metallic (e.g. Cu, Ag) or ceramics based (e.g. ZnO, Al$_2$O$_3$, TiO$_2$, Fe$_3$O$_4$, lead zirconate titanate, ZrO$_2$, SiO$_2$) materials. The present invention does not only enlarge the number of available ink variations, due to introducing an admixture that works more effectively than the others, viscosity controlled inks also eliminate the binder burn-out during sintering of 3D objects. The sintering is a critical step that can result in cracks. Therefore the present invention has a potential to solve the problems arising from dimensional changes during sintering. This further enables an extent of time savings in the fabrication of objects through additive manufacturing.

By adding several new material systems to the limited palette of AM options, the inks (specifically the viscosity controlled inks or the additive manufacturing inks) comprising the admixture according to the present invention can enable benchtop manufacturing in industry as well as in public makerspaces due to its green nature. With ease-in-optimization/modification of viscosity without necessitating organic solvents, cost-effectiveness, and user-friendliness, (viscosity controlled) inks according to the present invention have also the potential to be available in do-it-yourself stores in near future. The admixture according to the present invention can be easily used without requiring a laboratory set-up, since it can be prepared by using water as the mere solvent.

The potential of such admixtures (by even enabling use of water as a single and environmentally benign solvent), renders it possible to prepare truly viscosity-controlled inks that offer higher dimensional control, higher aspect ratios, thin-walled features, time-savings during the manufacturing and post-manufacturing when compared to the prior art disclosures. Thus, the green and easy-to-use nature of such viscosity controlled inks can allow industry to have enhanced capabilities. With the present inventive concept, it is enabled to create a tangible library of several ceramic and metal inks for direct ink writing (DIW) and inkjet printing; and utilize them fabricating electronic circuit elements on flexible substrates such as elastomers and paper. For DIW, the manufacturing of thin-walled, high aspect ratio 3D objects is rendered possible. With the inks comprising the admixture according to the present invention, the fabrication of complex 3D objects with thin walls is made available, since one of the strengths of such inks is the ability of formation of robust filaments.

The term 'aspect ratio' here represents the ratio of the total available height (e.g. in mm) of stacked ink filaments when printed onto a surface, to the width of filament (in case where the filament is mainly cylindrical, the width corresponds to its diameter; yet various cross section geometries are available in filaments by selecting different nozzle opening shapes.

Starting from the present invention, inkjet printing is closer to have the potential of being applied onto non-flat surfaces, since this process also requires a precise viscosity control in inks. Inks that are to be deposited in droplet form necessitate much lower values of viscosity. Nevertheless, at a given value of viscosity, the aim can be formulated as to fill the droplet with colloidal particles in a highest concentration in order to obtain higher resolution and to eliminate the coffee ring effect. With the inkjet printing inks comprising the admixture according to the present invention, it is possible to print well-defined features, with higher amount of deposited materials, and thus ensure higher resolution.

The rheological properties of the (metal or ceramics based colloidal) inks according to the present invention can be fully tailored through steric and electrosteric modification of the surface of the particles and tuning the pH of the dispersive medium. With the present invention, the intermediary steps of mechanical ball milling/ultrasonication during the preparation of the suspensions and the post stepwise heat treatments for removal of the high loadings of the additives from printed inks are eliminated. The production methods related to the admixture and the inks according to the present invention are simple, cost-effective and environmental friendly.

Thus the following objects are achieved by the present invention:
overcoming the abovementioned shortcomings of the prior art, and
provision of:
an admixture for obtaining environmentally benign and easy-to-prepare/optimize/control inks for additive manufacturing, and
a water based admixture to be employed in highly loaded inks for additive manufacturing and inkjet printing inks loaded with a higher amount of inorganic particles than those available in the related technical field.

What is claimed is:

1. An ink for additive manufacturing, comprising an admixture, wherein the admixture comprises at least one copolymer with a backbone and the backbone comprises at least one electrically charged monomer; the at least one copolymer is a grafted copolymer having mean molecular weight within a range between 600 g/mol and 3000 g/mol on side chains of the grafted copolymer.

2. The ink according to claim 1, wherein the at least one copolymer comprises one or more monomers selected from the group consisting of 2-acrylamido-2-methylpropane sulfonic acid, vinyl phosphonic acid, N-[3 (dimethylamino) propyl] methacrylamide, 2-(tert-butylamino) ethyl methacrylate, and 2-vinyl pyridine, as modifying blocks.

3. The ink according to claim 1, wherein the backbone comprises acrylic acid or methacrylic acid.

4. The ink according to claim 3, wherein the at least one copolymer comprises one or more monomers selected from the group consisting of 2-acrylamido-2-methylpropane sulfonic acid, vinyl phosphonic acid, N-[3 (dimethylamino) propyl] methacrylamide, 2-(tert-butylamino) ethyl methacrylate, and 2-vinyl pyridine, as modifying blocks.

5. The ink according to claim 1, wherein the at least one copolymer is an alternating or random copolymer.

6. The ink according to claim 5, wherein the backbone comprises acrylic acid or methacrylic acid.

7. The ink according to claim 5, wherein the at least one copolymer comprises one or more monomers selected from the group consisting of 2-acrylamido-2-methylpropane sulfonic acid, vinyl phosphonic acid, N-[3 (dimethylamino) propyl] methacrylamide, 2-(tert-butylamino) ethyl methacrylate, and 2-vinyl pyridine, as modifying blocks.

8. The ink according to claim 5, wherein the ink comprises 60 wt. % to 80 wt. % of inorganic solid content with respect to a total weight of an ink composition, and has a volume fraction of the ink within a range of 35% (v/v) and 55% (v/v) with respect to a total volume of the ink composition.

9. The ink according to claim 1, wherein the at least one copolymer is a block copolymer.

10. The ink according to claim 9, wherein the backbone comprises acrylic acid or methacrylic acid.

11. The ink according to claim 9, wherein the at least one copolymer comprises one or more monomers selected from the group consisting of 2-acrylamido-2-methylpropane sulfonic acid, vinyl phosphonic acid, N-[3 (dimethylamino) propyl] methacrylamide, 2-(tert-butylamino) ethyl methacrylate, and 2-vinyl pyridine, as modifying blocks.

12. The ink according to claim 1, wherein the ink comprises 60 wt. % to 80 wt. %_of inorganic solid content with respect to a total weight of an ink composition, and has a volume fraction of the ink within a range of 35% (v/v) and 55% (v/v) with respect to a total volume of the ink composition.

13. The ink according to claim 12, wherein a ratio of the at least one copolymer is 2.5 wt % or less with respect to a total weight of the inorganic solid content.

14. The ink according to claim 12, wherein the ink is in a form of a filament.

15. The ink according to claim 14, wherein the ink has a width of equal to or less than 500 micrometers.

16. A method of additive manufacturing, comprising employing one or more copolymer with a backbone comprising at least one electrically charged monomer as an admixture in an ink composition, wherein the one or more copolymer is a grafted copolymer having mean molecular weight within a range between 600 g/mol and 3000 g/mol on side chains of the grafted copolymer.

17. The method according to claim 16, wherein the method comprises selection of the at least one electrically charged monomer such that the backbone comprises acrylic acid or methacrylic acid.

18. The method according to claim 16, wherein the method comprises selection of the at least one electrically charged monomer such that the one or more copolymer comprises one or more monomer selected from the list consisting of 2-acrylamido-2-methylpropane sulfonic acid, vinyl phosphonic acid, N-[3 (dimethylamino) propyl] methacrylamide, 2-(tert-butylamino) ethyl methacrylate, and 2-vinyl pyridine, as modifying blocks.

19. A printed component prepared using the ink according to claim 1.

20. The printed component according to claim 19, wherein the printed component has a flexible surface at a stage of printing.

\* \* \* \* \*